United States Patent [19]
Bradley et al.

[11] Patent Number: 4,747,038
[45] Date of Patent: May 24, 1988

[54] DISK CONTROLLER MEMORY ADDRESS REGISTER

[75] Inventors: John W. Bradley, West Peabody; Edward F. Getson, Jr., Lynn; Bruce R. Cote, Dracut, all of Mass.

[73] Assignee: Honeywell Bull Inc., Minneapolis, Minn.

[21] Appl. No.: 94,052

[22] Filed: Sep. 4, 1987

Related U.S. Application Data

[63] Continuation of Ser. No. 657,715, Oct. 4, 1984, abandoned.

[51] Int. Cl.[4] ............................................. G06F 13/00
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 4,156,907 | 5/1979 | Rawlings et al. | 364/200 |
| 4,161,778 | 7/1979 | Getson, Jr. et al. | 364/200 |
| 4,210,959 | 7/1980 | Wozniak | 364/200 |
| 4,453,215 | 6/1984 | Reid | 364/200 |
| 4,454,595 | 6/1984 | Cage | 364/900 |
| 4,479,179 | 10/1984 | Dinwiddie, Jr. | 364/200 |
| 4,486,826 | 12/1984 | Wolff et al. | 364/200 |
| 4,511,960 | 4/1985 | Boudreau | 364/200 |
| 4,513,392 | 4/1985 | Shenk | 364/900 |
| 4,558,429 | 12/1985 | Barlow et al. | 364/900 |
| 4,583,194 | 4/1986 | Cage | 364/900 |

Primary Examiner—Gary V. Harkcom
Assistant Examiner—Randy W. Lacasse
Attorney, Agent, or Firm—George Grayson; John S. Solakian

[57] ABSTRACT

A disk controller address register is used to address both a disk controller memory and a system memory between which data is transferred as it is stored on or retrieved from a disk storage device. A single address is provided to the address register which then develops other addresses needed in the data transfer between the two memories.

2 Claims, 3 Drawing Sheets

DISK CONTROLLER 3

DISK CONTROLLER MEMORY ADDRESS REGISTER

This application is a continuation of application Ser. No. 657,715 filed Oct. 4, 1984, now abandoned.

RELATED APPLICATION

The following U.S. patent application field on an even date with the instant application and assigned to the same assignee as the instant application is related to the instant application and is incorporated herein by reference.

"Programmable Universal Synchronization Byte Detector" by Edward F. Getson, Jr., John W. Bradley and Bruce R. Cote, having U.S. Ser. No. 657,716 and filed on Oct. 4, 1984, now U.S. Pat. No. 4,663,733.

BACKGROUND OF THE INVENTION

1. Field of the Invention

This invention relates generally to the field of mass storage disk controllers.

2. Description of the Prior Art

A data processing system typically includes, in addition to a central processing unit, a main memory subsystem and a mass storage subsystem. The mass storage subsystem includes a number of disk drives and a disk controller.

In the slower speed prior art systems typically having a data bit rate of 5 megahertz or less, the disk controller would assemble the data bits received from the disk device into data bytes. Blocks of data bytes would be transferred to main memory under control of the CPU.

As the disk technology improved, data bit rates in the order of 10 megahertz were feasible. To process data bytes at this rate, typical disk controllers would store bytes in a first in-first out memory. Data bytes would be transferred to main memory as the data bits were being received from the disk drive and organized into bytes.

For the higher data bit rates of the order of 15 megahertz, the disk controller included a random access memory to store a block of data bytes. The data bytes were transferred to main memory after the entire block was stored in RAM.

For the block transfer between the data RAM and main memory, prior art disk controllers include a first address register for the data RAM and a second address register for main memory. Under firmware control, each address register is loaded with their respective address. Information is transferred between the address location specified by the contents of the first address register and the address location specified by the contents of the second address register.

This technique balanced the hardware cost of the two registers against the read only memory (ROM) cost of the firmware to manipulate the contents of the two registers. Since the cost of ROM's was high, designers tried to use more hardware to reduce the firmware stored in the ROM for the address generation. Accordingly, it was economical to provide two address registers.

2. However, the cost of ROM's has decreased greatly. Today's designs lean toward the greater use of firmware compared to the use of hardware in the design.

OBJECTS OF THE INVENTION

Accordingly, it is an object of the invention to provide an improved disk controller.

It is another object of the invention to provide a higher performance disk controller.

It is still another object of the invention to provide a disk controller having a reduced product and maintenance cost.

SUMMARY OF THE INVENTION

A block of data is transferred between main memory and a disk device under control of a disk controller. The disk controller includes a data random access memory (RAM) for storing the block of data received from main memory for transfer to the disk device, and the block of data received from the disk device for transfer to main memory.

The disk device reads and writes 8-bit bytes which are stored in or read from the RAM. Main memory stores two data bytes in each word location.

A single address register located in the disk controller addresses both main memory and the RAM for the transfer of data bytes.

During the read from RAM and write into main memory operation, two data bytes are read from RAM on successive RAM read cycles. The first data byte is stored in data output register A during the first RAM read cycle and the second byte is stored in data output register B during the second RAM read cycle. The address register is incremented after each read cycle. During each first RAM read cycle, the address register points to the main memory location into which the contents of data output registers A and B are written and points to the location in RAM from where the next data byte of the block of data is read and stored in data output register A. Note that the contents of the address register addresses both RAM and main memory on each odd RAM read cycle.

During the read from main memory and write into RAM operation, the contents of the address register points to a word location storing two bytes which are transferred to data input register A and data input register B, respectively.

The contents of the address register are incremented to point to the location in RAM into which is written the data byte stored in data input register A during the first RAM write cycle. The contents of the address register are again incremented to point to the RAM location into which is written the contents of data input register B and also point to the location in main memory to read out the next data word for storing in data input register A and data input register B. Note that main memory is addressed during each even RAM write cycle.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
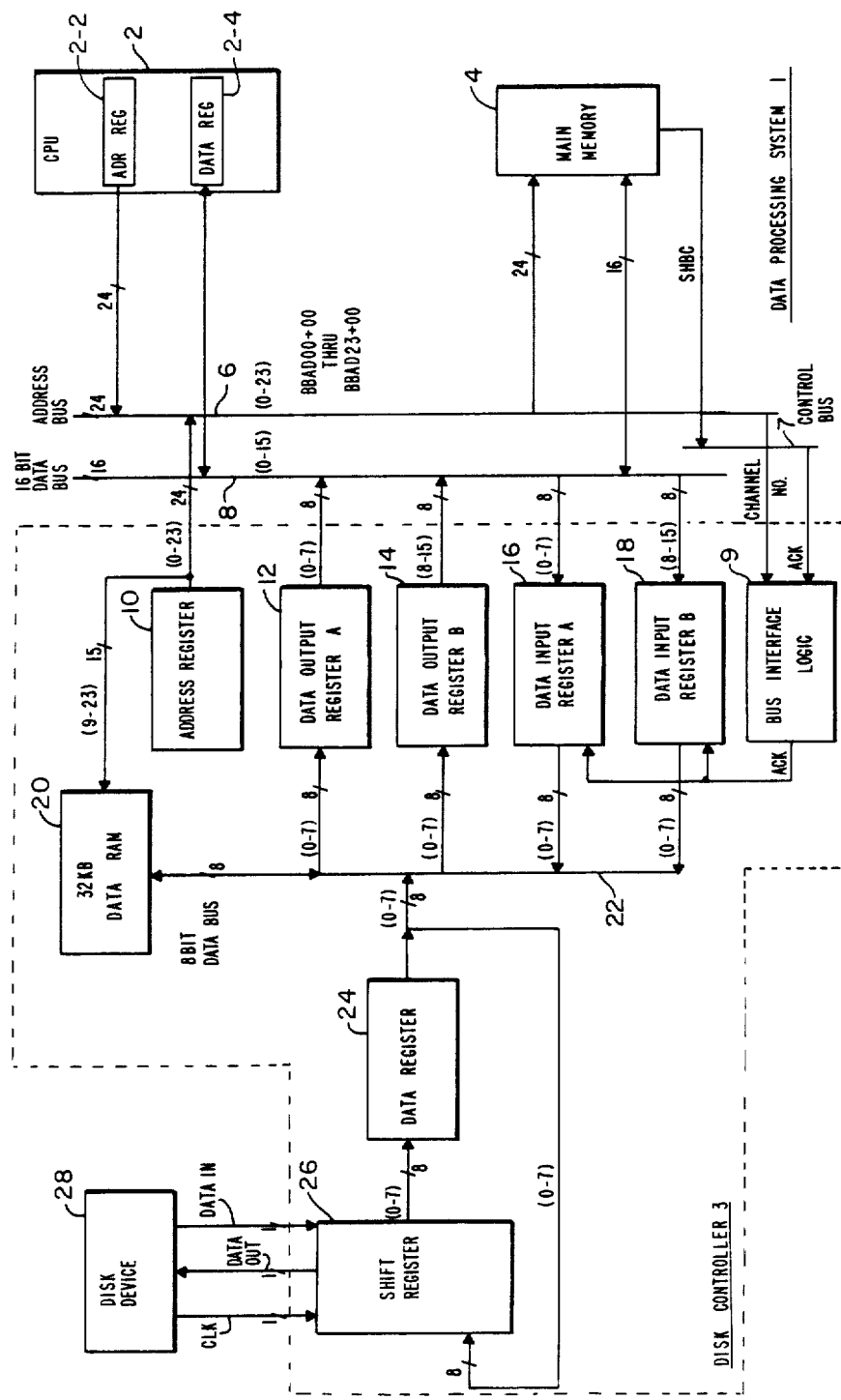
FIG. 1 shows a block diagram of the overall system.

FIG. 1 shows the data processing system 1 which includes a central processing unit (CPU) 2, a main memory 4 and a disk controller 3, all coupled in common to a 16-bit data bus 8 and a 24-bit address bus 6. A disk device 28, one of a number of disk drives, is coupled to disk controller 3.

The CPU 2 initiates a data transfer between the disk device 28 and main memory 4 by addressing main memory 4 by an address stored in address register 2-2. A configuration word is received in data register 2-4 and stored in an address location of a data random access memory (RAM) 20 at a location specified by an address stored in address register 10. A number of configuration words and an input/output (I/O) instruction are transferred to data RAM 20. The disk controller 3 uses the configuration and instruction words to condition the disk drive to transfer data bits stored in a specified sector on a track of a disk of disk device 28 to the disk controller 3.

Data bytes are read from the track and applied to a "shift in" input terminal of a shift register 26. The bits of the data byte are clocked into shift register 26 by a clock signal from disk device 28.

The logic for storing a complete data byte in shift register 26 is described in copending related application Ser. No. 657,716, now U.S. Pat. No. 4,663,733, entitled "Programmable Universal Synchronization Byte Detector" which is incorporated herein by reference. The data byte is transferred to a data register 24 for transfer over an 8-bit data bus 22 to a 32 KB data random access memory (RAM) 20 where it is stored in a byte location specified by bits 9 through 23 of the contents of an address register 10.

The data byte transfer from disk device 28 to data RAM 20 continues until an entire block of data bytes is stored in data RAM 20. The number of data bytes in the data block is determined by the configuration range word previously received from a central processor unit (CPU) 2 as described in the aforementioned Ser. No. 657,716, now U.S. Pat. No. 4,683,733.

The configuration range word includes a range number, which is the number of data bytes to be transferred during this input/output order response. The block transfer is complete when the range is decremented to ZERO.

At that time the data bytes stored in data RAM 20 are transferred to main memory 4 via a data output register A 12 which transfers the first data byte of a 2-byte word and a data output register B 14 which transfers the second data byte and 16-bit data bus 8.

The address register 10 stores the location of the data byte read in data RAM 20 and the location of the 2-byte word stored in main memory 2.

For the data byte transfer from data RAM 20 to main memory 4, assume that data byte A is stored in location hexadecimal 0000, data byte B is stored in location hexadecimal 0001, data byte C is stored in location hexadecimal 0002, and data byte D is stored in location hexadecimal 0003. Initially the contents of address register 10 are set to point to location hexadecimal 0000. Data byte A is read from that location and stored in data output register A 12. The contents of address register 10 are then incremented to hexadecimal 0001. Data byte B is read from that location and stored in data output register B 14.

The contents of address register 10 are then incremented to hexadecimal 0002. This results in the outputs of data output register A 12 and data output register B 14, storing data bytes A and B, being stored in main memory 4 at location hexadecimal 0002.

Note that data RAM 20 is addressed by bits 9 through 23 of address register 10. Each byte location is addressable. However, in this example main memory 4 is word addressable. Therefore, bit 23 of address register 10 is ignored by main memory 4.

Data byte C is read from location hexadecimal 0002 and stored in data output register A 12 and the contents of address register 10 is incremented to hexadecimal 0003. Data byte D is read from data RAM 20 and stored in data output register B 14 and the contents of address register 10 incremented to hexadecimal 0004. The contents of data output register A 12 and data output register B 14 storing data bytes C and D are stored in location hexadecimal 0004 of main memory 4 which is the word location following location hexadecimal 0002.

Assume a main memory 4 to data RAM 20 with data bytes E and F stored in word location hexadecimal 1000 and data bytes G and H stored in word location hexadecimal 1002 of main memory 4. Note that the low order bit 23 is dropped.

The contents of address register 10 are initialized to hexadecimal 1000. Main memory 4 will read out the contents of location hexadecimal 1000, data bytes E and F, Data byte E is stored in data input register A 16 via data bus 8 bits 0–7 and data byte F is stored in data input register B 18 via data bus 8 bits 8–15.

Main memory 4 signals disk controller 3 that the data word is available on data bus 8 via a second half bus cycle signal SHBC, a control bus 7, bus interface logic 9 and an acknowledge signal ACK which clocks the data word into data input register A 16 and data input register B 18. The disk control 3 is responsive to its channel number received from address bus 6.

The contents of address register 10 are incremented to hexadecimal 1001 and data byte E is stored in data RAM 20 at that location. For the next read cycle, the contents of address register 10 are incremented to hexadecimal 1002. Data RAM 20 will store data byte F in location hexadecimal 1002 and main memory 4 will read out data bytes G and H into data input register A 16 and data input register B 18, respectively.

As described above, data byte G will be stored in location hexadecimal 1003 of data RAM 20 and data byte H will be stored in location hexadecimal 1004 on subsequent write cycles.

Figure 2:
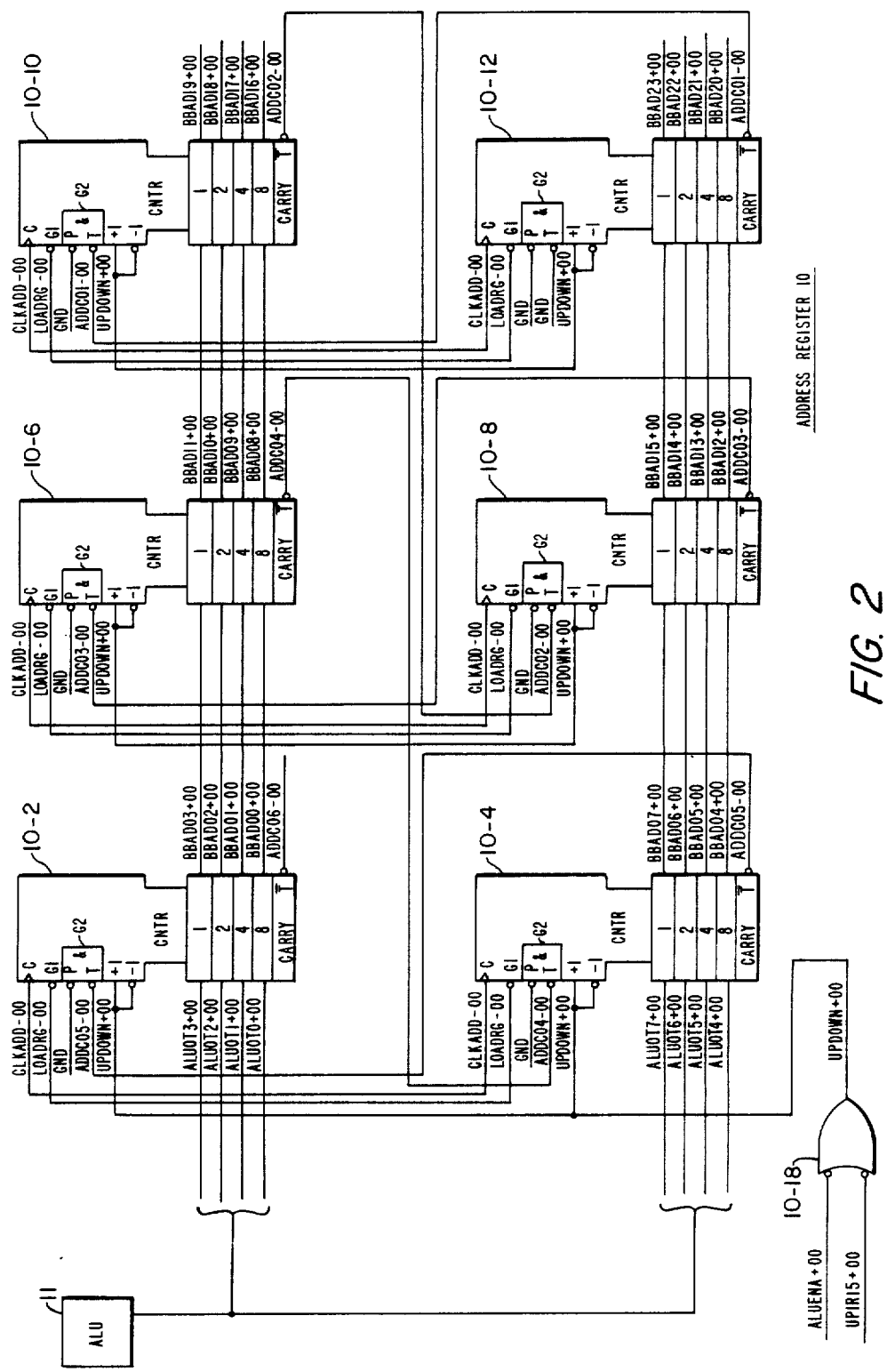
FIG. 2 is a logic diagram of address register 10.

FIG. 2 shows the detailed logic of the address register 10 which is made up of six counters 10-2, 10-4, 10-6, 10-8, 10-10 and 10-12. They are typically Texas Instruments 74LS169 circuits, described in "The TTL Data Book for Design Engineers", Second Edition, published 1976 by Texas Instruments Incorporated of Dallas, Tex.

The counters are loaded on three ALU 11 cycles by light signals ALUOT0+00 through ALUOT7+00. Counters 10-2 and 10-4 are loaded on the first cycle with the first byte. Counters 10-6 and 10-8 are loaded by signals BBAD00+00 through BBAD07+00 from counters 10-2 and 10-4 with the first byte while ALU 11 is loading the second byte into counters 10-2 and 10-4. Counters 10-10 and 10-12 are loaded on the third cycle with the first byte by signals BBAD08+00 through BBAD15+00 from counters 10-6 and 10-8. On that cycle counters 10-6 and 10-8 are loaded with the second byte and counters 10-2 and 10-4 are loaded from the ALU 11 with the third byte. The three bytes make up the 24-bit address. All 24 bits address main memory 4 and 15 bits, BBAD09+00 through BBAD23+00, address data RAM 20.

Counters 10-2, 10-4, 10-6, 10-8, 10-10 and 10-12 are loaded by a LOADRG-00 signal low applied to a G1 terminal on the rise of a CLKADD-00 signal applied to a clock terminal.

Carry signals ADDC01-00 through ADDC05-00 couple the six counters to enable normal incrementing and decrementing of the address register 10. The UP-DOWN+00 signal applied to the +1 and −1 terminals indicates the increment or decrement operation, respectively. Note that a ground signal GND is applied to the P terminals of all six counters and the carry signal applied to the T terminals of the five high order counters. A counter will increment on the rise of the CLKADD-00 signal when the signals applied to the P and T (G2) terminals are low.

Figure 3:
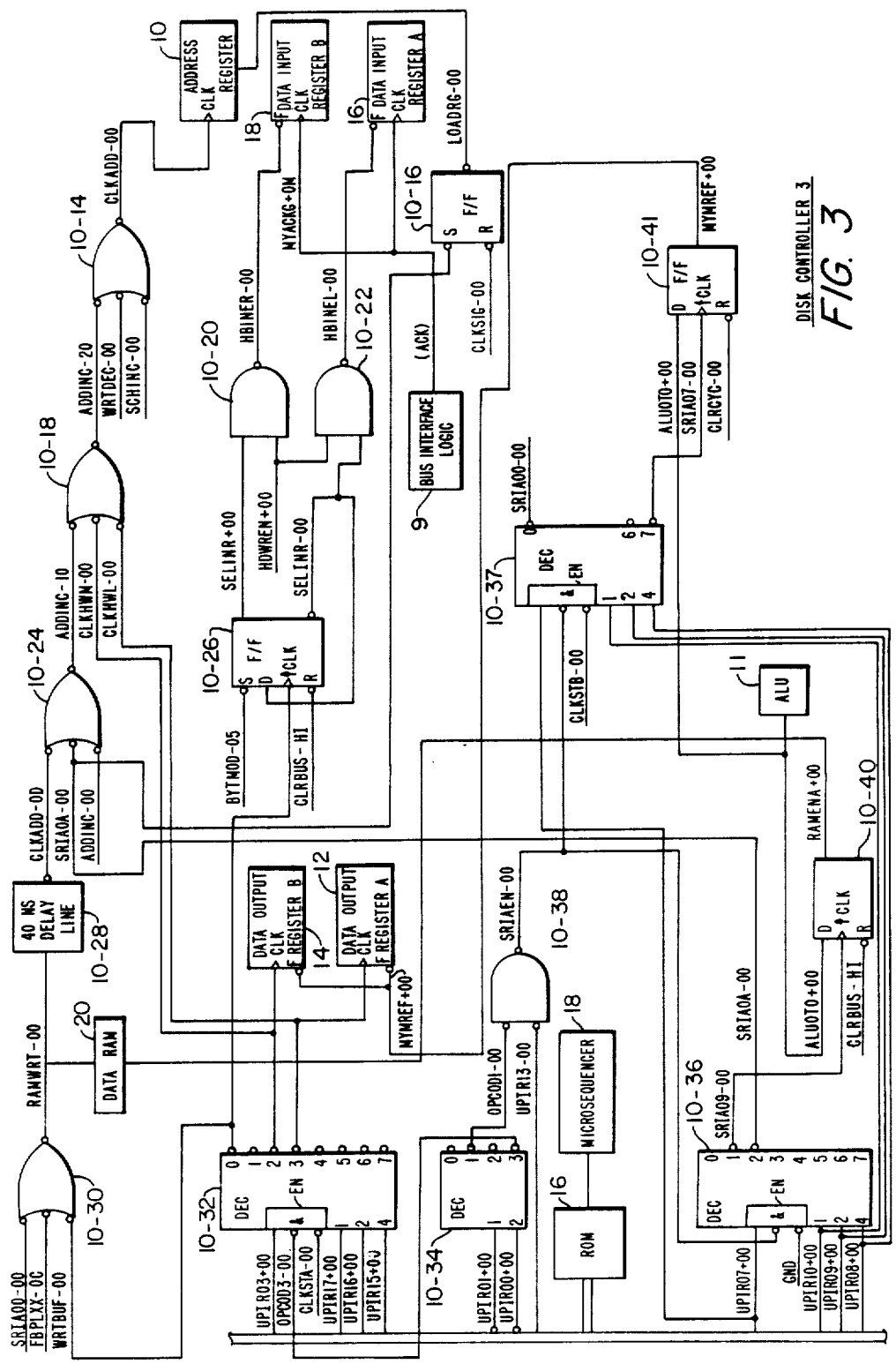
FIG. 3 is a logic diagram of disk controller 3.

FIG. 3 shows the detailed logic controlling address register 10 during the data RAM 20-main memory 4 data transfer.

The loading of the address register 10 is controlled by a microsequencer 18 which addresses a microprogram stored in a ROM 16. ROM 16 generates signals UPIR10+00, UPIR09+00 and UPIR08+00 which are applied to the 1, 2 and 4 select terminals of a decoder 10-36. Decoder 10-36 is enabled by signals UPIR07+10 and SRIAEN-00. Signals UPIR00+00 and UPIR01+00 applied to a decoder 10-34 generate signal OPCOD1-00 which is applied to a negative AND gate 10-38. Signal UPIR13-00 is applied to the other input terminal of negative AND gate 10-38. Therefore, signal UPIR01+00 high, signal UPIR00+00 low, signal UPIR13+00 low, signal UPIR08+00 low, signal UPIR09+00 high and signal UPIR10+00 low result in the decoder 10-36 output signal SRIAOA-00 low. Signal SRIAOA-00, therefore, sets a flop 10-16 to generate the load register signal LOADRG-00 which is applied to the six counters of address register 10.

Signal SRIAOA-00 low also generates the clock signal CLKADO-00 via a negative OR gate 10-24, a signal ADDINC-10 low, a negative OR gate 10-18, a signal ADDINC-20 low, a negative OR gate 10-14 and clock signal CLKADD-00 low, which is applied to address register 10. The data byte from ALU 11 is applied to the 1, 2, 4 and 8 input terminals of counters 10-2 and 10-4 and are stored in the counters on the rise of the clock signal CLKADD-00. This occurs at the end of the cycle when signal SRIAOA-00 goes high. Flop 10-16 is then reset by timing signal CLKSIG-00 to condition the address register 10 to receive the second data byte as described supra.

For the main memory 4 to data RAM 20 operation, address register 10 stores the address location of the two data bytes in main memory 4 which are to be stored in the same designated address locations in data RAM 20. Note that as described supra main memory 4 ignores the low order bit signal BBAD23+00, FIG. 1, to designate the word address.

A signal MYACKG+OM generated by main memory 4 via bus interface logic 9 clocks the two data bytes read from main memory 4 and data bus 16 for storage in data input registers A 16 and B 18, respectively. Then under firmware control, a write buffer signal WRTBUF-00 is generated by a decoder 10-32 in order to condition or write data into data RAM 20.

ROM 16 generates signal UPIR03+00 high and signal UPIR15+00, UPIR16+00 and UPIR17+00 low. Also signals UPIR01+00 and UPIR00+00 high are applied to decoder 10-34 to generate signal OPCOD3-00 low. When clock signal CLKSTA-00 goes low, signal WRTBUF-00 goes low and is applied to a negative OR gate 10-30 thereby generating a RAMWRT-00 signal to initiate a data RAM 20 write cycle.

Since flop 10-26 is not set until the end of the cycle, output signal SELINR-00 which is applied to a NAND gate 10-20 is high. Also a signal HDWREN+00 is forced high by firmware to enable a read from data input registers A 16 and B 18. Output signal HBINEL-00 from NAND gate 10-22 enables the output of data input register A 16 to write the first of two data bytes in data RAM 20.

Flop 10-26 sets at the end of the first data RAM 20 read cycle on the rise of the WRTBUF-00 signal. The write buffer signal WRTBUF-00 is again generated by decoder 10-32. This generates a second write data RAM 20 read cycle by generating signal RAMWRT-00. This time, however, flop 10-26 is set and signal SELINR+00 applied to a NAND gate 10-32 forces signal HBINER-00 low, thereby enabling the output data input register B 18 to write the second data byte in data RAM 20. Flop 10-26 is reset at the end of the memory cycle on the rise of signal BYTMOD-OS. Signal BYTMOD-OS sets flop 10-26 on a single byte transfer from main memory 4 to data input register B 18. Flop 10-26 may be reset by a system clear signal CLRBUS-HI.

The RAMWRT-00 signal also increments the address register 10 by generating the CLKADD-00 signal via a 40 nanosecond delay line 10-28, a CLKADD-OD signal, negative OR gate 10-24, signal ADDINC-10, negative OR gate 10-18, signal ADDINC-20, and negative OR gate 10-14. The address register 10 is incremented after storing each data byte and now stores the location of the next data word (two bytes) to be read from main memory 4.

For the data RAM 20 to main memory 4 operation, address register 10 stores the location in data RAM 20 of first byte to be transferred to main memory 4. A data RAM 20 read cycle is initiated by generating a RAM enable signal RAMENA+00. A flop 10-40 is set under microsequencer 18 control by ROM 16 generating signal SRIA09-00 from decoder 10-36; signal UPIR10+00 is high and signals UPIR08+00 and UPIR09+00 are low. Flop 10-40 is set on the rise of signal SRIA09-00 when signal ALUOTO+00 from ALU 11 is high.

During the data RAM 20 read cycle in which the first byte is read from data RAM 20, signal CLKHWM-00 is generated by the firmware from output terminal 2 of decoder 10-32. In this case, the decoder 10-32 is enabled as described supra; singla UPIR15+00 is low, signal UPIR16+00 is high, and signal UPIR17+00 is low. Signal CLKHWM-00 clocks the first data byte into data output register A 12. Address register 10 is incremented by signal CLKHWM-00 applied to negative OR gate 10-18 to generate signal CLKADD-00.

During the next data RAM 20 read cycle, the firmware generates signal CLKHWL-00 at output terminal 3 from decoder 10-32. Now signal UPIR15+00 is low and signals UPIR16+00 and UPIR17+00 are high.

Signal CLKHWL-00 clocks the second data byte into data output register B 14 and generates the CLKADD-00 signal via negative OR gate 10-18 to increment address register 10.

The contents of data output registers A 12 and B 14 are transferred to main memory 4 under firmware control via data bus 8 at the address stored in address register 10.

A decoder 10-37 generates a clock signal SRIA07-00 to set a flop 10-41 when signal ALUOTO+00 is high. Output signal MYMREF+00 applied to the F terminal of data output register A 12 and data output register B 14 enables the output signals placing the two data bytes on data bus 8. Signals UPIR07+00 through UPIR10+00 are high, signal SRIAEN-00 is low and clock signal CLKSTB-00 is low.

Also, the same address is applied to data RAM 20 to read out the next data byte into data output register A 12 by the firmware, again generating signal CLKHWL-00 and again incrementing the address register 10 as described supra.

The data input registers A 12 and B 14 and the data output registers A 16 and B 18 are 74S374 logic elements described in the aforementioned "TTL Data Book for Design Engineers".

A number of signals are shown in FIG. 3 which are not a part of the invention but are included for completeness.

Signal SRIA00-00 applied to negative OR gate 10-30 from decoder 10-37 indicates an ALU 11 to data RAM 20 data transfer. Signal FBPLXX-0C applied to negative OR gate 10-30 indicates a disk device 28 to data RAM 20 data transfer. Signal ADDINC-00 applied to negative OR gate 10-24 gives the firmware a means of incrementing or decrementing the address register 10 by binary ONE during a data RAM 20 write operation.

Signal WRTDEC-00 applied to negative OR gate 10-14 increments the address register 10 on a data RAM 20 to disk device 28 data transfer. Signal SCHINC-00 increments the address register 10 during a disk device 28 search for the sector address.

Having shown and described a preferred embodiment of the invention, those skilled in the art will realize that many variations and modifications may be made to affect the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A disk controller address register used for transferring bytes of data between a disk in a disk drive and a main memory, said disk controller including a first memory and first, second, third and fourth registers, said address register comprising:
   a program store responsive to a first address and a first indication that a first word made up of a first and a second byte of data is to be transferred from said main memory at a location therein addressed by said first address to said first memory, to generate a first signal;
   a first decoder responsive to said first signal to generate a second signal that causes said first and second bytes of said first word to be transferred from said main memory respectively to said first and said second registers;
   a second decoder also responsive to said program store and to a second address, which is said first address incremented by one by said address register to initiate transfer of said first byte of said first word from said first register to said first memory at a location therein addressed by said second address;
   said first decoder then generating a third signal that coupled with a third address, which is said second address incremented by one by said address register, initiates transfer of said second byte of said first word from said second register to said first memory at a location therein addressed by said third address and, after said first word has been transferred to said first memory, said first decoder causes said first and said second register to respectively be enabled to store first and second bytes of a second word read from said main memory at a location therein addressed by said third address;
   said program store being responsive to a second indication that a third word made up of a first and a second byte of data is to be transferred from said first memory to said main memory to cause the generation of a fourth signal;
   a third decoder responsive to said program store to generate said said fourth signal, that coupled with a fourth address causes said first byte of said third word to be transferred to said third register;
   said first decoder then generating a fifth signal that coupled with a fifth address, which is said fourth address incremented by one by said address register, causes said second byte of said third word to be transferred to be transferred to said fourth register; and
   a fourth decoder, that after said second byte of said third word is transferred to said fourth register, generates a sixth signal that coupled with a sixth address, which is said fifth address incremented by one by said address register, causes both said first and second bytes of said third word to be transferred to said main memory at a location therein addressed by said sixth address; said sixth address then also being applied to said first memory to cause a first byte of a fourth word to be transferred therefrom to said third register to start the transfer of said fourth word to said main memory.

2. Buffer storage and addressing apparatus in a disk controller used for transferring data words between a storage disk and a main memory, said buffer storage apparatus comprising
   a first memory for storing blocks of data words being transferred between said disk and said main memory;
   first register means receiving individual words from said first memory for storage in said main memory or receiving individual words from said main memory for storage in said first memory to create blocks of words that are to be stored on said disk; and
   addressing control means receiving a first address and a first indication of which way data words are to be transferred between said disk and said memory;
   when data words are being transferred from said main memory to said disk, said addressing control means reads a first two byte word from said main memory at a location therein addressed by said first address and stores said first word in said first register means, said addressing control means then incrementing said first address to generate a second address and a third address used to sequentially address two locations in said first memory in which are respectively stored a first byte and a second byte of said first word, and said third address is also then used to read a second word from said main memory for storage in said first register means and subsequent transfer to said first memory means, and when data words are being transferred from said disk to said main memory means via said first memory means, said addressing control means addresses said first memory means using a fourth address to read a first byte of a two byte third word therefrom which is stored in said first register means, said control means incrementing said fourth address to generate fifth and sixth addresses, said fifth address then being used to address said first memory to read a second byte of said third word therefrom which is stored in said first register means, said sixth address then being used by said addressing control means to address said main memory and both bytes of said third word are stored therein from said first register means, and finally said control means addresses said first memory means using said sixth address to read out a first byte of a two byte fourth word for storage in said first register means to be subsequently stored in said main memory.

* * * * *